United States Patent [19]
Mayersak

[11] Patent Number: 5,866,838
[45] Date of Patent: *Feb. 2, 1999

[54] PRECISION GUIDANCE SYSTEM FOR AIRCRAFT LAUNCHED BOMBS

[75] Inventor: Joseph R. Mayersak, Ashburn, Va.

[73] Assignee: Lockheed Martin Corp., Bethesda, Md.

[ * ] Notice: The term of this patent shall not extend beyond the expiration date of Pat. No. 5,657,947.

[21] Appl. No.: 853,603

[22] Filed: May 9, 1997

Related U.S. Application Data

[63] Continuation of Ser. No. 562,426, Nov. 24, 1995, Pat. No. 5,657,947, which is a continuation-in-part of Ser. No. 295,108, Aug. 24, 1994, Pat. No. 5,507,452.

[51] Int. Cl.$^6$ ............................................. F41G 7/34
[52] U.S. Cl. ................................. 89/1.56; 89/1.51
[58] Field of Search .................... 342/62, 357; 244/3.19; 89/1.56, 1.51

[56] References Cited

U.S. PATENT DOCUMENTS

| | | | |
|---|---|---|---|
| 3,803,974 | 4/1974 | Everest et al. | 89/1.56 |
| 4,711,152 | 12/1987 | Fortunko | 89/6.5 |
| 4,918,609 | 4/1990 | Yamawaki | 364/449 |
| 5,126,748 | 6/1992 | Ames et al. | 342/353 |
| 5,229,538 | 7/1993 | McGlynn et al. | 89/1.56 |
| 5,260,709 | 11/1993 | Nowakowski | 342/62 |
| 5,344,105 | 9/1994 | Youhanaie | 244/3.14 |
| 5,378,155 | 1/1995 | Eldridge | 434/11 |
| 5,438,337 | 8/1995 | Aguado | 342/357 |
| 5,443,227 | 8/1995 | Hsu | 244/3.12 |
| 5,450,448 | 9/1995 | Sheynblat | 375/346 |
| 5,458,041 | 10/1995 | Sun et al. | 89/1.11 |
| 5,593,513 | 1/1997 | Cohen | 342/357 |

FOREIGN PATENT DOCUMENTS 3-291582 A   12/1991   Japan .

*Primary Examiner*—Charles Jordan
*Assistant Examiner*—Christopher K. Montgomery
*Attorney, Agent, or Firm*—Charles E. Temko

[57] ABSTRACT

The disclosure relates to a low cost and highly accurate precision guided system suitable for use in conventional aircraft launched bombs. The system includes a kit mounted upon the nose of the conventional bomb which replaces the conventional fuse disposed in a fuse well, the kit including guidance electronics controlling a self-contained jet reaction device and GPS P-code receiver electronics. The bombs are readied for discharge by radio frequency signals broadcast from the aircraft into the bomb bay which transfer initial GPS data and commence operation of a gas generator which powers the jet reaction device.

4 Claims, 8 Drawing Sheets

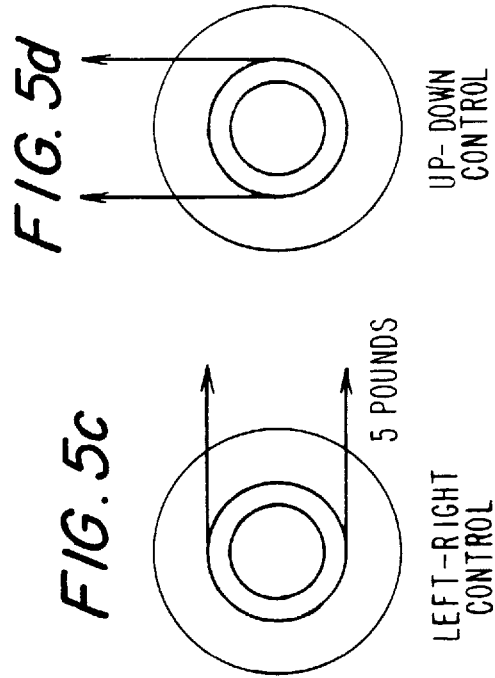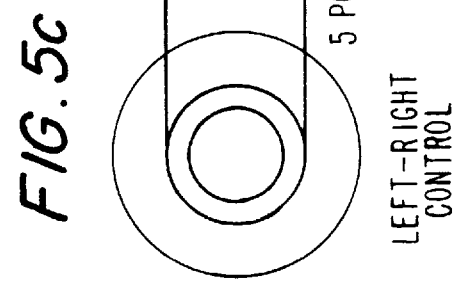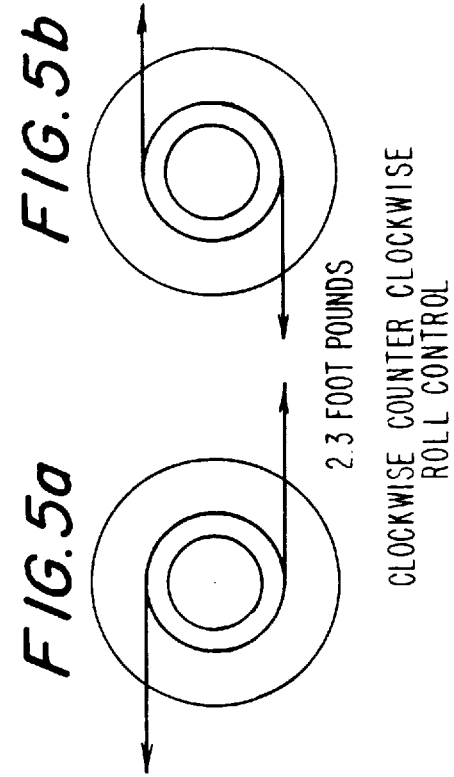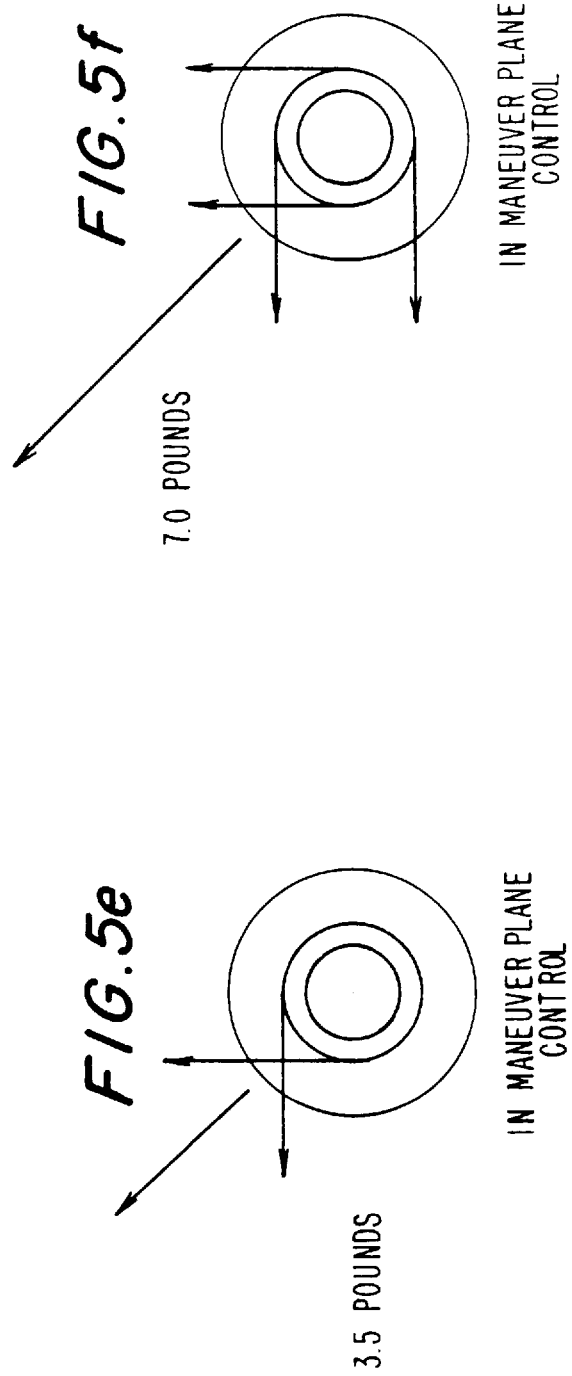

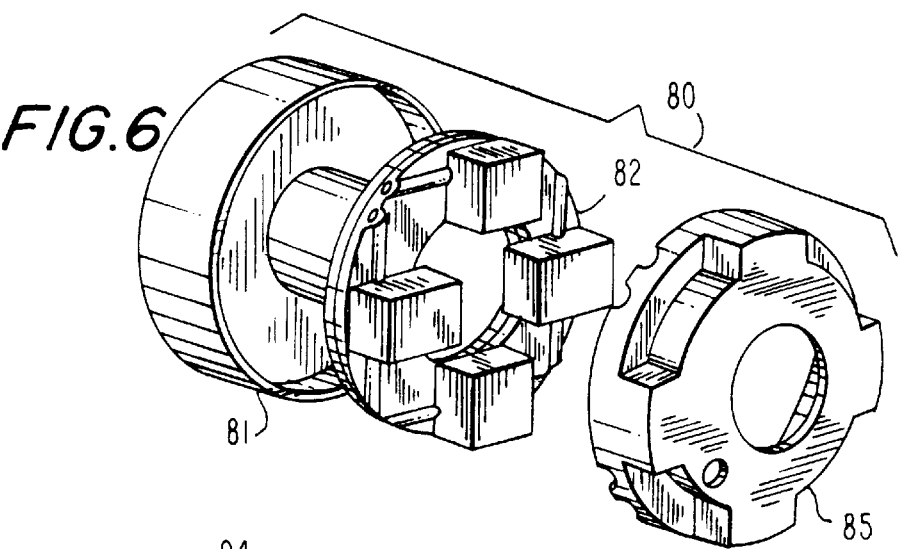
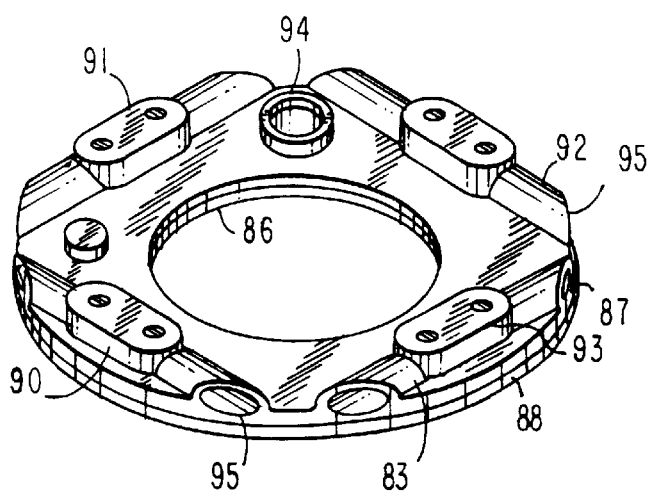
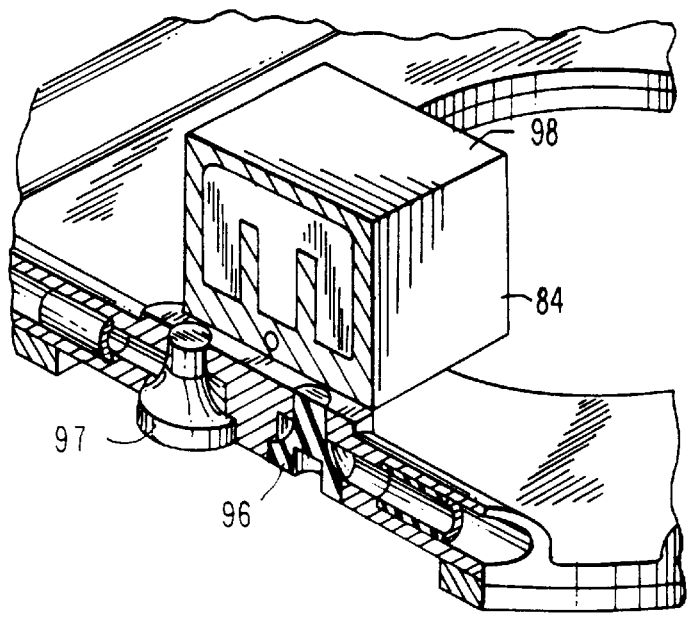

PRECISION GUIDANCE SYSTEM FOR AIRCRAFT LAUNCHED BOMBS

RELATED APPLICATION

This application is a continuation of my application Ser. No. 08/562,426 now U.S. Pat. No. 5,657,947, filed Nov. 24, 1995, in turn, a continuation-in-part of my application Ser. No. 08/295,108 U.S. Pat. No. 5,507,452 filed, Aug. 24, 1994 under the title Precision Guidance System for Aircraft Launched Bombs.

BACKGROUND OF THE INVENTION

This invention relates generally to the field of maneuverable vehicles, and more particularly to an improved and low-cost guidance system requiring a minimum number of components, as is desirable in the case of conventional bomb modification, to improve delivery accuracy. This system provides an extremely accurate and low-cost conventional bomb attachment kit that requires no modification to the delivery vehicle.

DISCUSSION OF THE PRIOR ART

A problem continually faced by personnel involved in the design, development, and operation of air-to-ground conventional weapons is how to precisely position those devices to neutralize the target within the constraints of cost, complexity, and aircraft survivability. Conventional weapons, such as unguided bombs, most often require the employment of considerable numbers in order to achieve the desired target results. This, in turn, most often requires large numbers of delivery aircraft using delivery geometry that places them in high risk situations.

Several methods of achieving micro-positioning have been considered. One method is through the use of fixed opposable force-based systems. Such a system will usually be comprised of a large number of thrusters fixed to the body of the maneuverable device. Combinations of these thrusters can then be fired to effect the desired maneuver. Two weapon systems that use this technique are the U.S. Army Hypervelocity missile and the Command Adjusted Trajectory projectile. There are several drawbacks to these fixed opposable force-based thruster-based systems. For most applications, a large number of thrusters are needed. More thrusters relates to a higher cost.

Another technique is the use of Global Positioning System (GPS). Current GPS navigation and guidance systems require three dimensional angular position data in order to navigate an air vehicle from one position to another. Current GPS navigation and guidance systems generally obtain attitude information from an inertial navigation system (INS). Such a system usually consists of three rate gyroscopes, three accelerometers, and associated processing equipment. INS types are very costly. Another experimental system employs GPS carrier phase measurement on multiple antennas (radio interferometry) to determine three-dimensional attitude. As disclosed in U.S. Pat. No. 5,101,356, these systems are also complex and may not have the necessary sensitivity and speed for guidance of smaller vehicles, such as conventional bombs.

The use of guided ordnance launched from aircraft is known in the art. Unfortunately, the programming of individual bombs has involved relatively complex and expensive hard wiring installations suitable where only a relatively small number of bombs or missiles are carried.

SUMMARY OF THE INVENTION

Briefly stated, the present invention contemplates the provision of an improved navigation and maneuver system for conventional bombs, in which the above mentioned disadvantages have been substantially ameliorated.

Rather than the familiar GPS guidance and the on off thruster devices normally associated with thrusters, the present invention employs a unique and innovative "virtual umbilical" method to directly initialize the bomb GPS unit while still in the bomb/cargo bay, an inverse trajectory two point boundary guidance law to continually define best path guidance options using position and velocity states only, an innovative adaptive forward predictor polynomial network for guidance law implantation, and a compact jet reaction control system to effect bomb to target maneuver.

An RF (Radio Frequency) "virtual umbilical" weapon link uses an RF repeater to broadcast the GPS data obtained from the aircraft GPS system into the aircraft weapons bay to provide ephemeris and space vehicle clock data directly to the bomb for initialization. This method eliminates expensive changes to the aircraft by using the already installed GPS receiver system. It also provides for real-time bomb initialization while still in the weapons bay and significantly reduces the time in acquiring of the GPS satellite constellation.

An Adaptive Forward Predictor uses a polynomial network which permits the guidance law to be implemented with a multiplication concept rather than an integration concept. It also allows the trajectory to be wind compensated, permitting the guidance computer to be a low-cost 386-type processor chip. Moreover, the invention allows the bomb control forces to be obtained during flight using simple multiplication.

A jet Reaction Control Device makes use of a typical gas jet control system to effect bomb maneuver to the target. It permits the maneuver to be accomplished using an extremely low-cost approach. The compact jet reaction control concept permits the entire guidance kit to be packaged in an extremely small volume.

Applications of this new concept are both numerous and varied. It can be used wherever there is a need for very accurate positioning. This includes effecting maneuvers for guided missiles, artillery shells, and space vehicles. Potential applications include, but are not limited to, bombs, stand-off weapons, cruise missiles, unmanned surveillance vehicles, flying decoys to protect ships and aircraft, ground-launched munitions, antisubmarine weapons, atmospheric probes, and precision airdrop systems.

BRIEF DESCRIPTION OF THE DRAWINGS

In the drawings, to which reference will be made in the specification:

FIG. 5a through 5f is a concept diagram showing a jet reaction control maneuver system depicting various control functions forming part of the embodiment.

FIG. 6 is an exploded view in perspective of a jet reaction device adapted to be fitted to the front end of a bomb.

FIG. 7 is a view in perspective showing a valve plate element comprising a part of the jet reaction device.

FIG. 8 is a fragmentary view in perspective showing a valve control element in position upon the valve plate element shown in FIG. 6.

DETAILED DESCRIPTION OF THE DISCLOSED EMBODIMENT

OVERVIEW

Figure 1:
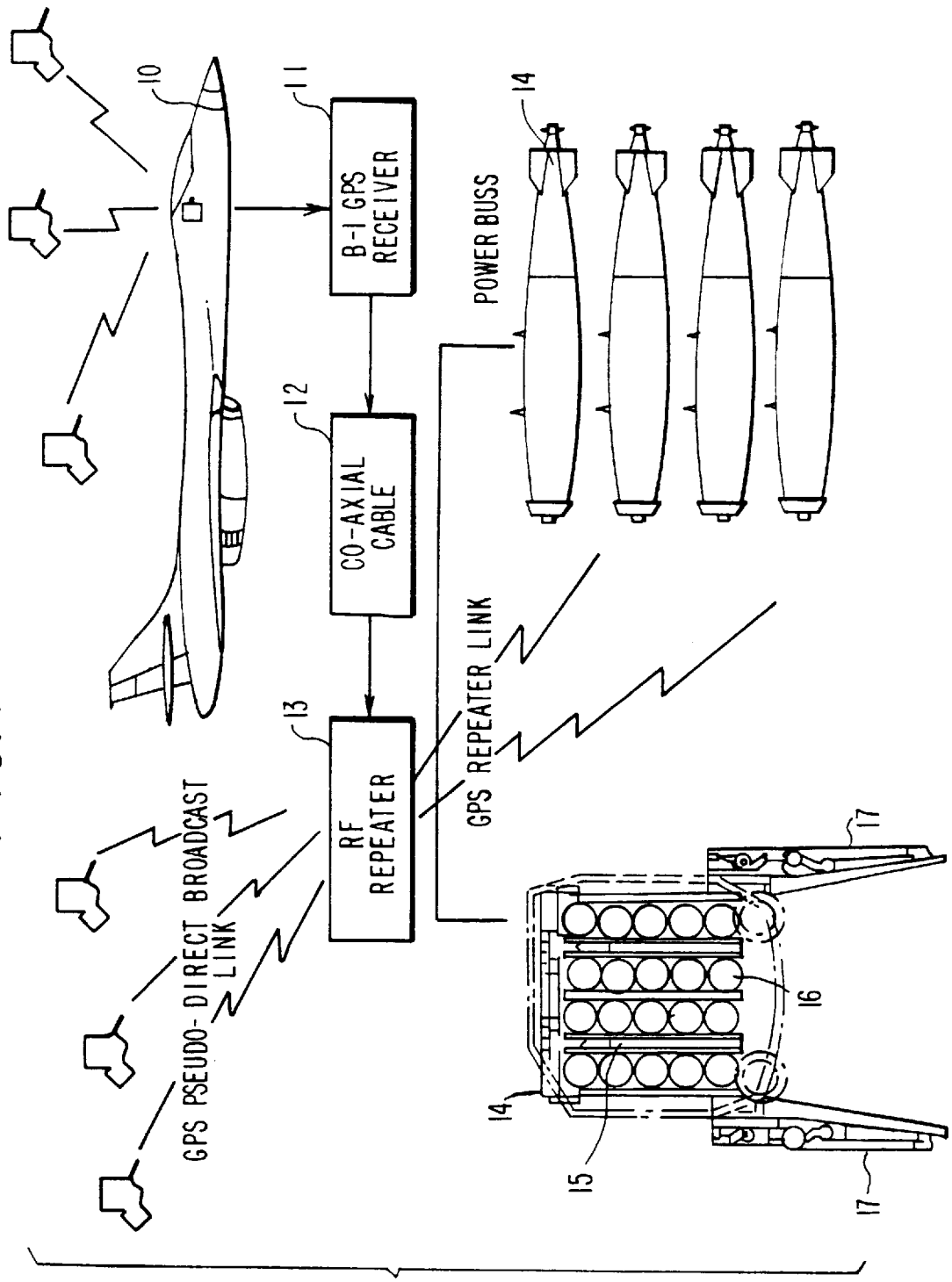
FIG. 1 is a pictorial concept view of the RF "Virtual Umbilical" weapon initialization forming a part of the disclosed embodiment.

The present invention makes use of current developments in GPS receivers and general signal processing technology. It also borrows ideas from systems in development, such as a jet control gas reaction to effect vehicle maneuvers. One component mounts into an existing fuse well thereby requiring no modifications to the bomb. A variety of guidance laws have been studied over the past several years including two point boundary value with multiple way points, minimum energy consumption trajectory, GPS-updated inertial, and discrete GPS-only guidance. The guidance law presented herein has been defined and demonstrated in computer simulations. The use of the two point value guidance law, employing inverse trajectories and using position and velocity states only, is an innovative means that continually selects the best path trajectory. Additionally, the use of an adaptive polynomial network permits a multi-tier curve fit to the inverse trajectory to be run off-line which enables the bomb to be guided with simple multiplication concepts. The RF "Virtual Umbilical" GPS link permits the maneuvering vehicle to be initialized while in a static state within the delivery vehicle. The use of an RF repeater to broadcast the GPS data obtained from the delivery vehicle GPS system into the delivery vehicle bomb/cargo bay to provide ephemeris and space vehicle clock data directly to the bomb (or other vehicle) to initialize its GPS system minimizes necessary modifications of both the aircraft and the bomb. A jet reaction maneuvering device is employed for maneuver control which is readily installed within the fuse well of existing ordnance.

SYSTEM OPERATION

The disclosed Precision Guidance System consists of a GPS-guided vehicle (a conventional bomb) and an RF "virtual umbilical" GPS datalink. Each bomb in the aircraft receives station keeping power from a bomb on-board battery. Upon command from the aircraft, via an RF repeater link broadcasting into the bomb bay, the bomb initializes a thermal battery to provide autonomous power to a bomb guidance and control kit. Power is supplied to the bomb GPS receiver and the bomb GPS receiver is then brought into operation. The GPS receiver is initialized via an RF repeater link from the aircraft GPS receiver. The repeater broadcasts RF energy into the bomb bay to provide a "virtual umbilical" to each bomb to transmit satellite ephemeris and clock data. Upon bomb drop, the bomb thermal battery provides power to the bomb guidance unit. Transition power is provided by a capacitor bank on the bomb. Upon release from the aircraft, the bomb captures the coarse code transmissions from the satellites. Upon coarse code acquisition, the bomb transitions to P-code track. The acquisition of the P-code after launch requires approximately five seconds. The bomb receives velocity and position updates from the GPS satellites once per second, and uses these position and velocity updates to effect guidance to the target. The weapon employs a roll drift control scheme to effect guidance. The guidance law then estimates the probable impact point for the weapon and determines the control force necessary to move the bomb to hit the target. Pitch and yaw corrections are accomplished by firing the correct combination of up and down, and left and right jet nozzles so that the resultant force moves the weapon to the target. This control force is input continuously into the bomb during the entire descent. Upon target impact, the bomb tail fuse detonates the weapon. From a 40,000-foot drop, the bomb jet reaction control system has the capability to provide plus or minus 10,000 feet of up-range or down-range correction; and plus or minus 10,000 feet of crossrange correction.

The delivery envelope, defined as the maneuver capability of the jet reaction system, from a 40,000-foot drop is essentially a circle having a radius of approximately 10,000 feet. From 40,000 feet, each bomb would be dropped and then guided to within 35 feet of its intended target. The 10,000-foot delivery envelope is large enough to allow the bombs to be dropped with each bomb being programmed to engage up to five different targets or more from its release point. Each bomb can be set during the mission planning stage to maneuver either to the target closest to its unguided impact point or to a given target located in the drop zone within the bomb footprint. The maneuver envelope is sufficiently large so that the weapon cannot miss.

RF "VIRTUAL UMBILICAL" SYSTEM

A radio frequency (RF) repeater is used to broadcast into the bomb bay the GPS signal necessary to initialize the GPS weapons in the bomb bay/cargo compartment. The RF repeater is also used to initialize the guidance kit thermal battery in all weapons. This is accomplished by transmitting a beginning message code to all bombs before the GPS data is provided to the weapons via the RF repeater link. This transmission of the GPS data, with the power-up command is accomplished by linking the aircraft GPS receiver to the RF repeater by a coaxial cable. Appropriate ephemeris and clock data from the aircraft GPS receiver is broadcast into the bomb bay/cargo compartment where it is used by each bomb to initialize their GPS receivers to track the P-code signal. Upon bomb release, the phase locked loops in the bomb GPS receivers would be anticipated to drift sufficiently to make it impossible to immediately reacquire the P-code signal. Consequently, the initiation process upon release first captures the C-code or course signal and then transitions to the track of the P-code signal. This is anticipated to require approximately five seconds. The use of the RF repeater as a means of initializing the GPS receivers on the bomb eliminates the requirement for any major modification of the delivery aircraft. Most aircraft have an open conduit which would allow the running of the coaxial cable necessary to the repeater. It is necessary only to interface that repeater to the aircraft GPS receiver.

INVERSE GUIDANCE

The bomb in the disclosed embodiment utilizes a two point boundary value guidance law to effect guidance of the current bomb position, i.e., the first point, to the target position, i.e., the second point. To allow this to be accomplished using only GPS position and velocity, the two point boundary value law is implemented "backwards". This is accomplished by integrating trajectories from the target coordinates backward into space to define all of the possible trajectories which have an end point at the target. At any plane traversing these trajectories, the intersection point of all of the trajectories which impact the target can be determined and the velocity and position states at these points established. The bomb passing through this plane would need only to know what its state is and the nearest state to the best path trajectory which would intercept the target. With this knowledge, the weapon can then effect a course correction to move to the best path trajectory and, ultimately, hit the target. Implementation of this two point boundary value guidance law is accomplished by integrating, off-line, all of the trajectories backwards and at every one-second interval, for example, stowing the data in terms of velocity and position in a micro-processor where they are then used by the guidance law in a look-up table to determine what the appropriate control force is to move the bomb to the nearest best path trajectory.

However, rather than use a look-up table, an adaptive polynomial network is employed which essentially "curve fits" the data calculated from the inverse integration of all the necessary trajectories. This adaptive polynomial network uses position and velocity and an approximate time to go in a multi-tier curve fit.

The use of the simple inverse trajectory two point boundary value guidance law allows the bomb to be flown knowing only bomb position and velocity. The position and velocity is provided by the GPS receiver in the guidance system. The target position is provided to the bomb prior to upload in GPS coordinates. The bomb roll angle in body coordinates is measured by a roll gyro. The target position, GPS bomb position, and bomb orientation in the inverse trajectory implementation allows a simple type 386 processor to determine the divert commands and body coordinates to cause the bomb to intercept the target by moving to the best path nearest trajectory. It should be noted that as the weapon continues its flight that it is constantly correcting to the best path trajectory to intercept the target and never attempts to return to an original trajectory. This process conserves maneuver energy since the weapon is continually flying the best path to the target.

FORWARD PREDICTOR

An adaptive polynomial network can be employed which essentially "curve fits" the data calculated from the inverse integration of all the necessary trajectories. This adaptive polynomial network uses position and velocity, and an approximate time to go in a multi-tier curve fit concept. In each tier, polynomials are utilized to convert the position, velocity, and time to go, to a prediction which is used by subsequent tiers which ultimately lead to the determination of the necessary force to move the bomb to the nearest best path trajectory which will intercept the target The inverse guidance concept allows the bomb guidance to be effected using only adaptive polynomial network curve fit to the trajectory data run off-line to determine control commands. This is only a multiplication process with the coefficients for the polynomials in each predictive tier stored in memory. Consequently, the guidance calculations are accomplished by a very low-cost computer such as an Intel 386-based machine.

The closed form solution for the bomb trajectory is determined for a vacuum trajectory for the bomb utilizing the initial GPS-provided velocity and position data. The difference between this vacuum trajectory and the actual bomb trajectory is due to differential ballistic force consisting of ballistic density effects and aeroballistic wind and control forces. The control force is known. Ballistic density can be estimated by calculating the drag on the weapon by comparing weapon current velocity in initial vacuum velocity and the estimated velocity in the trajectory states. Ballistic wind forces can also be estimated by comparing the bomb position in the trajectory to the vacuum trajectory position, corrected for drag. This difference is curve fitted with a second adaptive polynomial network which takes the current weapon states and provides an estimate to differential ballistic force based on the closed form trajectory solution. This output is then input into the adaptive polynomial network which calculates the control force and direction necessary to move the bomb on the best path intercept trajectory. This calculation is compensated for ballistic wind.

JET REACTION SYSTEM

The disclosed jet reaction system employs a device including a solid gas generator, a jet control vale assembly, an electromagnetic cover, and an electronics module. The control valve assembly consists of fast-acting solenoid actuators, poppet valves, and a hollow valve plate. The valve plate incorporates four sets of left and right firing nozzles. Upon launch, the solid gas generator is ignited pressurizing the system to 1,000 pounds pressure. The flow through each of a plurality of left and right firing nozzles is controlled through poppet valves which, in turn, are controlled by a fast-acting solenoid actuator receiving commands from an autopilot. The poppet valves provide continuous correction to the bomb attitude and trajectory during fall. The valve opening cycle is of the order of 20 milliseconds. The thrust of the control system varies typically from zero pounds to a maximum of 40 pounds and the burn time for the propellant is approximately 60 seconds. This variable control— variable force jet reaction system allows for the precise control of yaw, pitch and roll.

VIRTUAL UMBILICAL CONCEPT

As stated above, the system consists of a GPS guided vehicle and an RF "Virtual Umbilical" GPS data link.

To understand the "Virtual Umbilical" concept, it is necessary to understand the GPS signal and the GPS signal acquisition process.

The GPS navigation signal transmitted from the GPS satellites contains two frequencies. The $L_1$ signal, at 1575.42 MHz, is modulated with both the Precision Code (P-Code) and the Clear Acquisition Code (C/A code) pseudo-random noise codes in phase quadrature. The $L_2$ signal, at 1227.6 MHz, is modulated with the P-Code. Both the $L_1$, and $L_2$ signals are also continuously modulated with the navigation data bit stream at 50 bits-per-second (bps). The codes identify the satellites since the code patterns are unique to each satellite and provide a measurement of the navigation signal transit time by providing the data to allow the GPS receiver to measure the phase shift required to match codes.

The P-Code, operating at 10.223 Mbps, is a long precision code. The C/A code operates at 1.023 Mbps. It is a short code easily acquired by GPS receivers. For low cost GPS receivers, such as those anticipated for use in aircraft bombs, the usual process would be to first acquire the C/A Code and then transfer to the P-Code. In order for a GPS receiver to lock onto the P-Code it must know the time segment in the seven-day P-Code to search. The transfer to the P-Code is accomplished through the use of a handover word (HOW) which is contained in the navigation data stream. The P-Code generated in each satellite is a pseudo-random noise chip sequence of seven days in length. It is initialized each Saturday at midnight. GPS system time is counted from the initialization and counting is accomplished by summing the number of epochs, separated 1.5 seconds, of a subsidiary code generator, designated the $X_1$ code, as the Z time. The Z count rises to 403,199 at the point it is reinitialized to zero on Saturdays. The system Z value is transmitted to users every six seconds in the form of a handover word (HOW).

The C/A code repeats every millisecond and is easily matched and locked onto by a GPS receiver searching at nominal search rates on the order of 50 bps. The transfer to P-Code is facilitated by the HOW word. It indicates the point in the incoming P-Code that will occur at the next Z change in the next six seconds. The receiver generated (AP-Code is shifted in phase to synchronize with the designated point in the incoming P-Code when triggered by the change in the HOW.

The navigation message from the satellite contains information on the status of the satellite, the time synchronization information for transfer from the C/A to the P-Code and the parameters for computing the clock correction, the ephemeris of the satellite and the corrections for delays in the propagation of the signal through the atmosphere. It also contains almanac information on other space vehicles. The message is formatted into five subframes of six seconds in length which make up a data frame of 30 seconds. The length of a data frame is 1500 bits. Each data subframe begins with a telemetry word and the C/A to P-code handover word. The Block I data, contained in subframe 1, includes clock correction parameters and parameters used for correction of atmospheric delays. The Block II data in subframe 2 contains clock correction parameters and ephemeris parameters. Data Block Ir, containing ephemeris predictions, covers subframes 2 and 3 and also includes an age-of-data word. Subframe 4 is reserved for special messages which may be included in the data. Block III data in subframe 5 contains the Almanac data. The Almanac includes information of clock corrections, ephemerides, and atmospheric delays for the normal complement of 24 satellites. These data allow the receiver to select the four satellites required for a navigation solution. The total Almanac exceeds the capacity of single subframe and consequently is transmitted on a rotating page bias contained in 25 subframe 5 transmissions.

Figure 10:
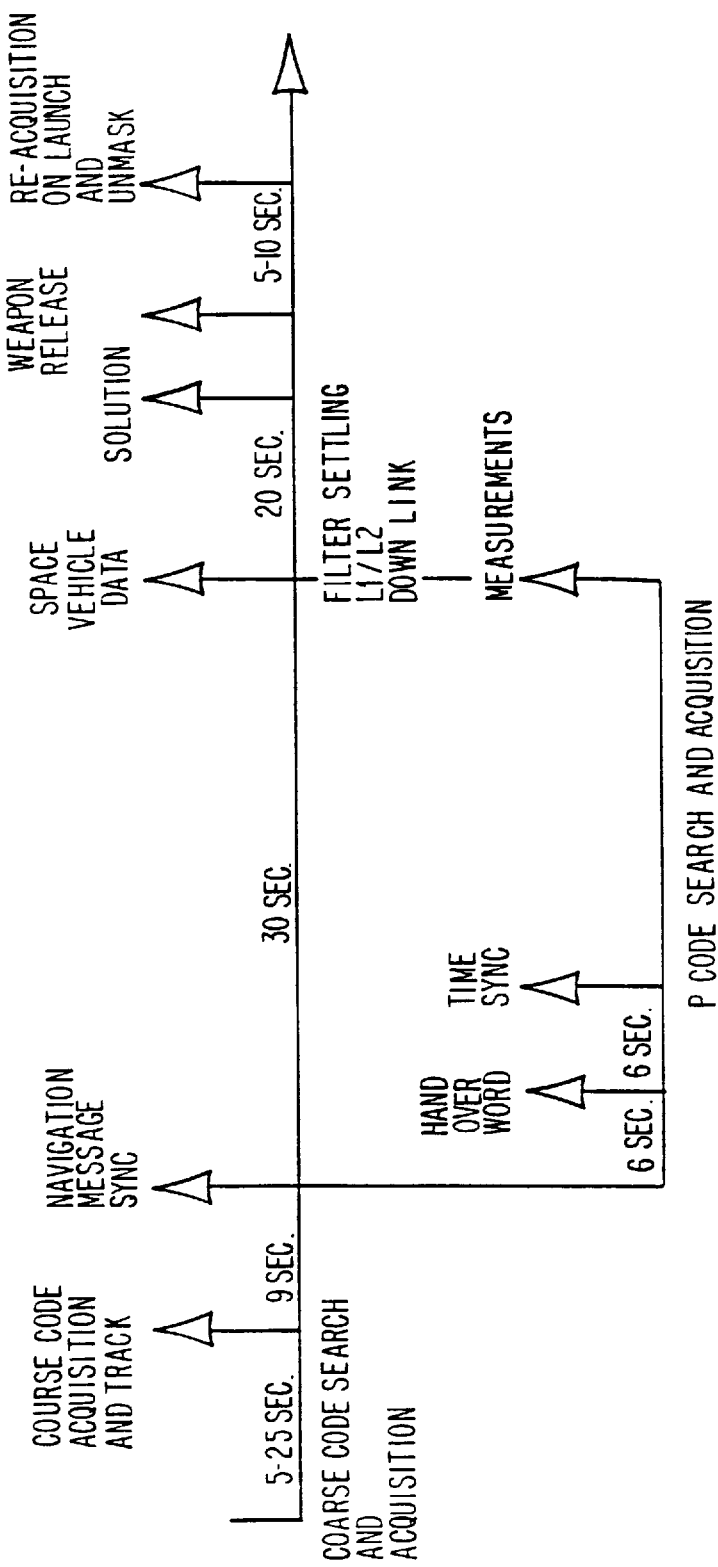
FIG. 10 is a schematic diagram showing GPS data acquisition time sequence.

The process of acquisition of the GPS signals by a five channel GPS receiver involves a sequence of processes (FIG. 10) including:

(1) C/A Code Acquisition. This process takes 5–25 seconds and involves the acquisition, and then track, of the GPS satellite system coarse code. This time for C/A-Code acquisition will depend upon the noise environment, the initial velocity and position uncertainty of the bomb GPS receiver and the number of correlators employed in the receiver. A typical bomb would use a low cost multi-correlator receiver to allow rapid C/A-Code acquisition and, finally, C/A-Code track.

(2) Navigation Message Frame Synchronization. This will take 8–10 seconds to synchronize the weapon GPS receiver with the GPS pseudo random signal frame and to then start to read the subframes to capture the navigation message data.

(3) Data Transfer. This will take 30 seconds and involves the reading of ephemeris, clock correlation and navigation message data. The 30 seconds is the time to read one coarse code or precision code five subframe navigation message. This assumption assumes that the weapons were provided with almanac data. It also assumes that the initial time, position and velocity accuracy estimates, relative to C/A code acquisition, are not in error by more than the order of 30 minutes, 30 nautical miles and 100 feet per second. In the case of the P-Code transfer there is an additional six second delay to read the handover word and six seconds to time synchronize the beginning of the P-Code. It would then require 30 seconds to read the five P-Code subframes. The event at the end of this activity is the capture of the satellite vehicle data.

(4) Navigation Solution: This event takes approximately 20 seconds and is essentially the setting of the $L_1$ and $L_2$ band filters to settle to allow an accurate estimate of the satellites navigation signal transit time, by measuring the phase shift n the signal, to be achieved. This will allow, in turn, the determination of the bomb position and velocity to be determined.

It will be necessary to activate the bomb GPS receivers in the bomb bay, or on the wing store stations, and to allow them to acquire and track the GPS signal to determine the bomb position and velocity prior to release from the aircraft. It will, as noted in the above discussion, require 60 to 90 seconds for a bomb GPS receiver to acquire, track and interrogate the navigation signals from the satellites to determine its position and velocity. The time of fall of a bomb to ground impact from an altitude of 30,000 feet is of the order of a minute. There is not sufficient time for a bomb to acquire the necessary GPS data to determine its position and velocity if it starts the process after it is dropped. Some means of activating the bombs and allowing the bomb GPS receivers to capture the GPS signals to allow them to determine their position and velocity prior to launch is required.

(5) The "Virtual Umbilical" hardware consists of:
  a) A GPS receiver. The GPS receiver consists of the GPS receiver with control processor, clock and antenna system. The receiver selects the four satellites to be employed by bombs, acquires, tracks and captures the GPS signal;
  b) A Signal Processor and Amplifier and Relay System. The signal processor:
    (1) Controls the "Virtual Umbilical" on and off functions. The signal processor, responding to an off-on switch setting selected by the aircraft pilot or weapon systems officer, activates the "Virtual Umbilical" system. Depending upon the number of such sequences, the signal processor also sets the states for the system to allow multiple weapon sequential ejection sequences to be initiated.
    (2) Generates the Beginning of Message Codes. The signal processor generates the beginning of message codes based upon the number of sequences the off-on switch has been activated to activate the bombs designated to be dropped by the aircraft pilot or weapon systems officer. The bomb drop sequence, in the case of the bomber, is predetermined for each bomb bay and bomb rack position and the beginning of message code would activate a group of bombs which would be dropped from a single bomb bay by bomb rack.
    (3) Amplifies and Relays the GPS $L_1$ and $L_2$ signals to the GPS repeater located in the bomb bay or near the single or multiple ejection racks mounted on pylons under the wing on a fighter aircraft. The very high update rate signal amplifier compensates the signal for the small time delay experienced in the transmission of the signal to the GPS repeaters.

C) GPS Repeater. The GPS repeater retransmits or broadcasts an RF signal consisting of the relayed and adjusted $L_1$ and $L_2$ GPS signals received from the four satellites selected by the "Virtual Umbilical" GPS receiver, into the bomb bay where the GPS receivers on each bomb acquire and track the signals and employ the navigation message data to calculate their position and velocity.

The "Virtual Umbilical" provides the means to:

a) Activate the bombs. The "Virtual Umbilical" would use a beginning of message code, monitored by station keeping electronics in each bomb, to determine when the bomb should fire its thermal battery and bring the bomb guidance system and the bomb GPS receiver, up to power. The beginning of message code would be a sequence of pulses based on a base 2 number system which would, through the transmission of "zeros" and "ones" provide each bomb station keeping electronics the information necessary to activate the bomb. The beginning of message code, in its simplest approach, could be transmitted via a L band—$L_1$ and $L_2$—RF data link to the station keeping electronics. Other approaches could use electro-optical, infrared or acoustic data links to transfer the base 2 message. The purpose of the beginning of message code is to turn the bombs on and bring the GPS receiver to the status to receive the GPS information.

b) Provide the GPS data to the bombs. The "Virtual Umbilical", after the transmission of the beginning of message codes, would then transmit the GPS navigation message into the bomb bay of the aircraft allowing the bombs which were activated to receive the data necessary to calculate their position and velocity prior to launch while still in the aircraft. When necessary to calculate their position and velocity prior to launch while still in the aircraft. When the bombs are dropped, they have already locked on to, tracked and captured the four satellites necessary to calculate their position and velocity. Upon release from the aircraft, the bombs will continue to update their estimates of position and velocity, using the navigation data provided by the GPS satellites, and using position and velocity state data guide to the target.

The "Virtual Umbilical" concept allows the GPS receivers located in each of the bombs activated for drop to acquire and track the GPS navigation signal as if the aircraft was not masking the weapons from a free line of sight to the satellites. The "Virtual Umbilical" allows the weapons to acquire the GPS signal when in an enclosed bomb bay or when carried on a wing pylon where the receivers are masked from the satellites by the aircraft wing.

Thus, the "Virtual Umbilical" concept provides an extremely cost effective approach to activating and providing GPS information weapon compared to the more conventional Mil STD 1760 weapon to aircraft Mil STD 1553 data buss interface. It eliminates the requirement for providing power to the weapons, providing sequence and command and control interface and a GPS electrical interface to the weapons. The attributes of the concept are clearly evident in considering the B-1B bomber, for example, which has the capability and capacity to carry eighty-four Mk-82 weapons. This would require, in the case of the Mil STD 1760 interface, eighty-four separate stations be wired for the Mil STD 1760 interface to one or more of the aircraft Mil STD 1553 data busses. The "Virtual Umbilical" approach on the other hand, would require only three repeaters, one for each bomb bay, be provided which can be run from a signal co-axial cable from the GPS receiver through conventional co-axial cable splitters. The cost of the Class A modifications to an aircraft fleet, such as the 100 aircraft B-1B fleet, are estimated to be reduced from of the order of $750 Million to of the order of $50 Million representing an order of magnitude cost reduction in weapons integration into the aircraft. The "Virtual Umbilical" when installed with a weapons dedicated GPS receiver can easily be integrated into aircraft with a Mil STD 1553 data buss structure and those aircraft which do not have a Mil STD 1553 data buss structure.

The "Virtual Umbilical" can use either a GPS receiver which is integral to the aircraft system as part of the aircraft navigation electronics or it can use a "weapon dedicated" GPS receiver which would be positioned through an existing aperture or new aperture in the aircraft skin to view the satellites directly. The concept can be used to view satellites directly or, with a GPS receiver positioned through the bottom of the aircraft, to view differential GPS ground station signals.

DETAILED DESCRIPTION OF THE DISCLOSED EMBODIMENT

With the foregoing discussion in mind, reference may now be made to the drawings. FIG. 1 illustrates a conventional military aircraft 10, typically a B-1 bomber, equipped with a GPS receiver 11 connected by coaxial cable 12 to a RF repeater 13. The aircraft bomb bay 14 is substantially unaltered, and includes storage racks 15 accommodating plural converted bombs 16, typically a known Mark 82 Lancer currently employed by the U.S. Armed Forces. The bomb bay doors 17 are opened and closed in conventional manner.

Figure 9:
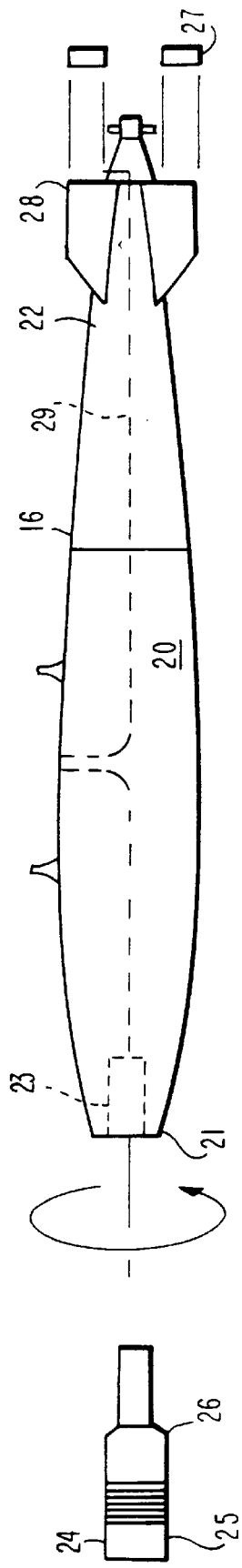
FIG. 9 is an exploded view in perspective showing a conventional aircraft launched bomb fitted with a guidance kit forming a part of the disclosed embodiment.

As best seen in FIG. 9, each bomb 16 includes a main body or casing 20 extending from a head or leading end 21 to a tail section 22. The head end includes a fuse well 23 which accommodates a conventional time or impact fuse which is replaced by the present system. The bomb would be tail fused when guided by the present system. Positioned in the well 23 is a guidance unit 24 including a guidance electronic section 25 and a GPS P-code receiver 26. A tail antenna 27 is positioned on or near tail fins 28, and leads 29 interconnect the antenna with the unit 24. As illustrated in FIG. 1, the RF repeater 13 upon the initiation of operation broadcasts directly to the bomb bay 14 initial GPS data and the necessary initiation signal prior to discharge of an individual bomb.

Figure 2:
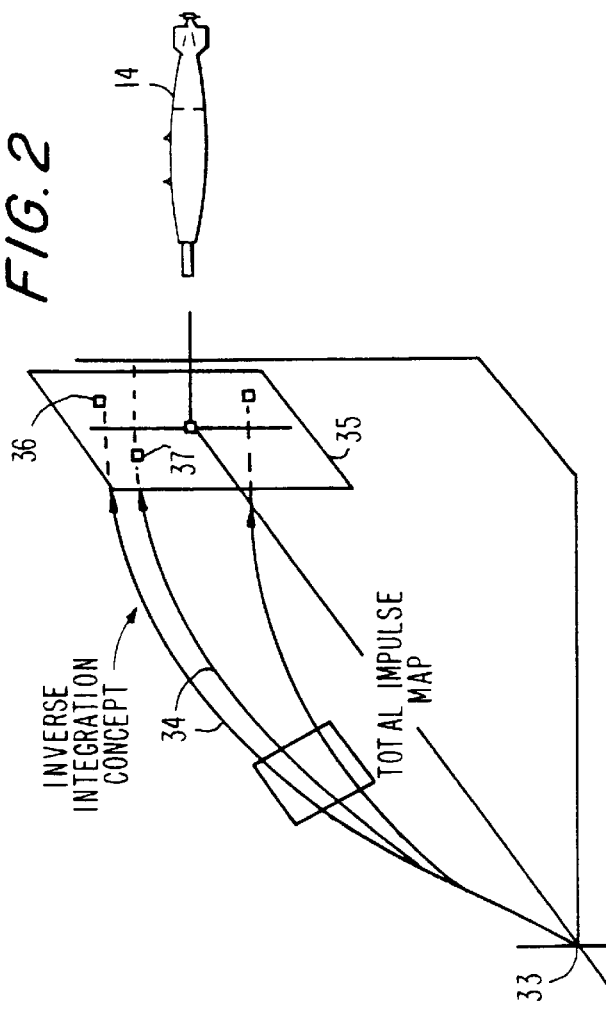
FIG. 2 is a schematic representation of an inverse guidance concept.

Referring to FIG. 2, there is graphically illustrated the inverse guidance concept discussed above. Reference character 33 designates the delivery point representing the second end of plural trajectories 34 which are intersected by a plane 35 to define multiple points 36 on each trajectory, including a point 37 which is closest to a particular bomb 14. At the time of discharge, the bomb possesses data relative to GPS velocity, position, and time to go.

Figure 2A:
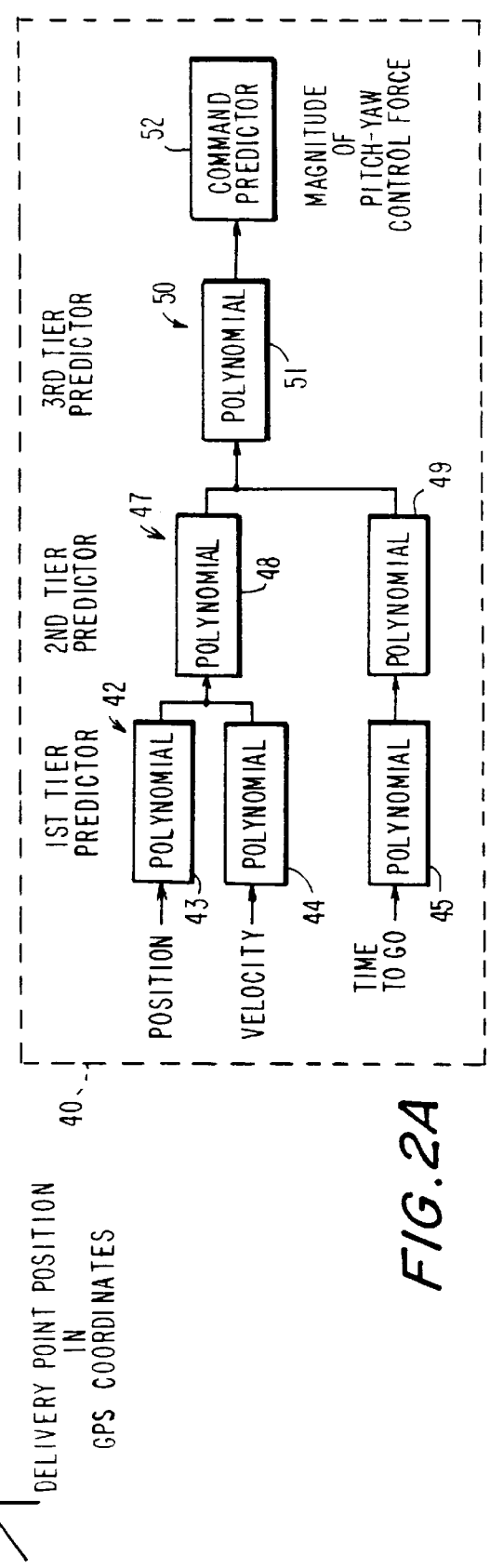
FIG. 2a is a block diagram of a polynomial network.

FIG. 2a graphically illustrates a first adaptive polynomial network 40 including a first tier predictor 42 including polynomials 43, 44, and 45, relating to position, velocity, and time to go. The output of these polynomials is fed to a second tier predictor 47 including first and second polynomials 48 and 49. The output of the second tier is fed to a third tier predictor 50 including a single polynomial 51 feeding a command predictor 52 which determines the magnitude of a pitch-yaw control force required in order to move the bomb onto the nearest trajectory.

Figure 3:
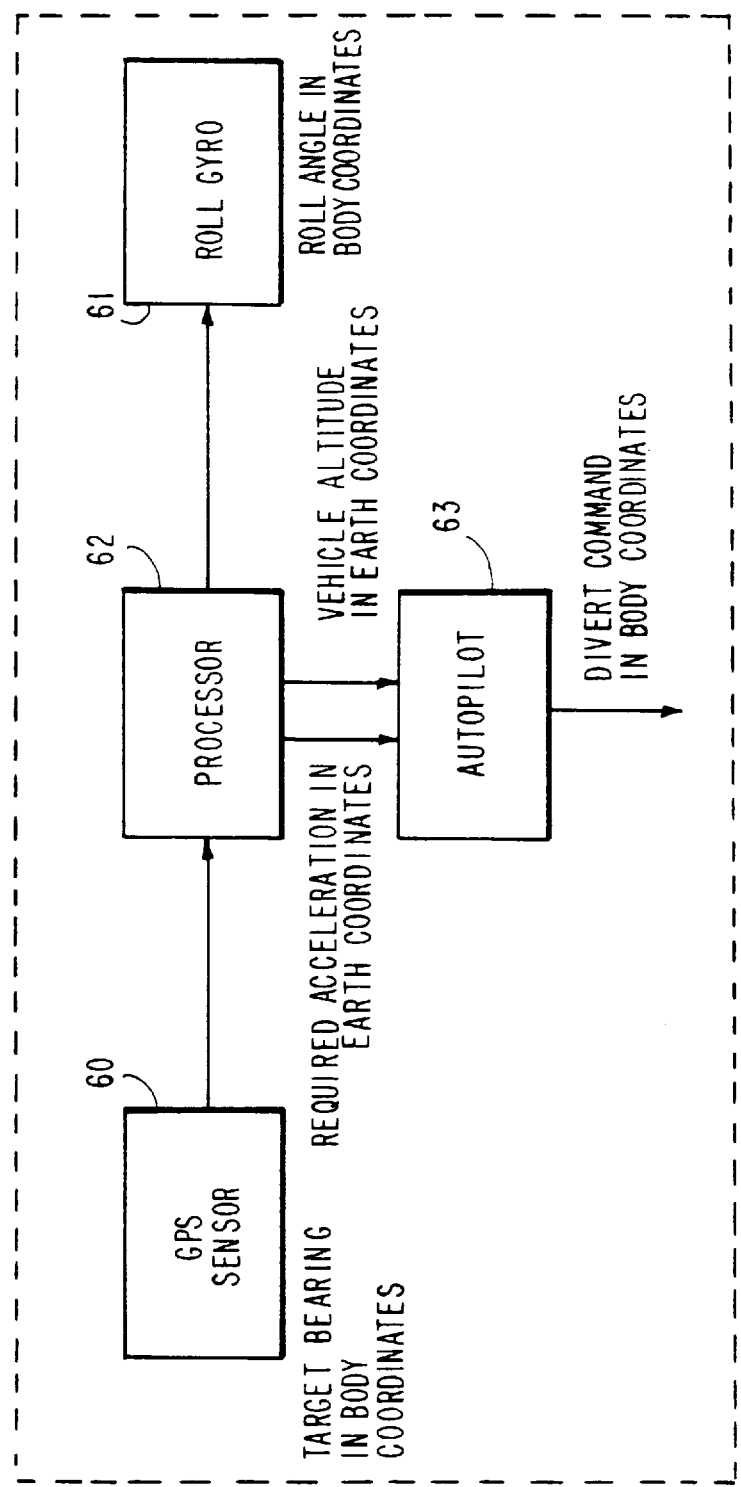
FIG. 3 is a block diagram showing input/output flow of the two point boundary inverse trajectory guidance law.

FIG. 3 graphically illustrates the use of a two point boundary value guidance law, wherein a GPS sensor 60 provides a target bearing in terms of body coordinates which data is fed to a processor 62. The processor also receives roll angle data in terms of body coordinates from a roll gyro 61. The processor 62 supplies divert commands to an auto pilot 63 in terms of body coordinates.

Figure 4:
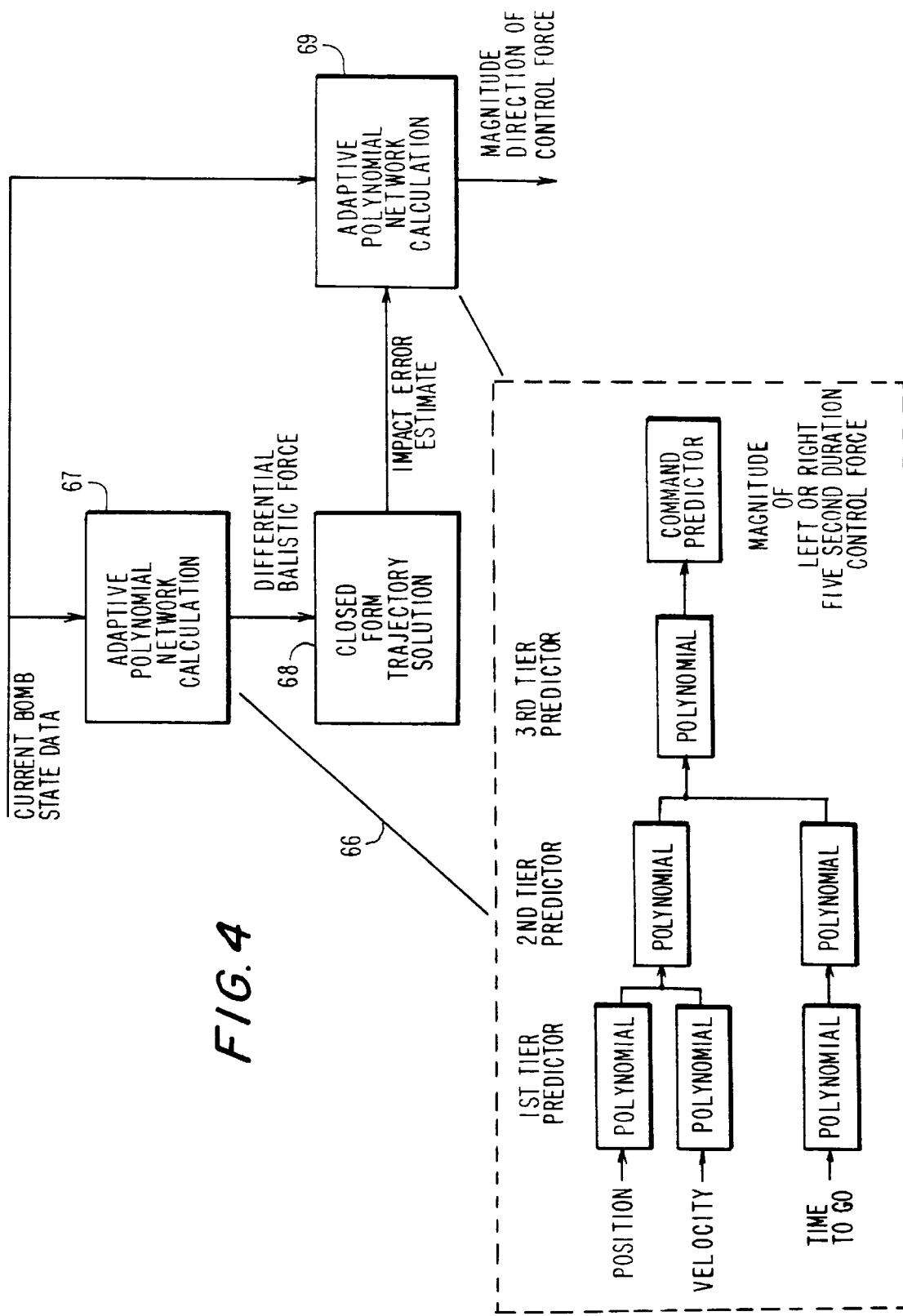
FIG. 4 is a block diagram of a forward predictor adaptive polynomial network.

FIG. 4 graphically illustrates the operation of the adaptive polynomial network of FIG. 2a, wherein current bomb state data 66 is subjected to the adaptive polynomial network calculation at 67, the output of which is fed to a closed form trajectory solution 68 which provides an impact error estimate as part of a second adaptive polynomial network calculation 69.

FIGS. 5a through 5f illustrate the various available forms of thrust used to steer the bomb to the nearest best trajectory. FIGS. 5a and b illustrate clockwise and counter clockwise roll control. FIGS. 5c and 5d illustrate left/right control and up/down control, respectively. FIG. 5e illustrates the use of thrust from two nozzles at a mutual 90 degree angle to obtain a resultant thrust at a 45 degree angle. FIG. 5f shows the use of four jet nozzles with greater effective thrust to obtain a similar result.

FIGS. 6, 7, and 8 illustrate a jet reaction device 80 including a solid propellant gas generator 81, a control valve assembly 82 including a valve plate 83 (FIG. 7) controlled by a multiple solenoid actuator 84 enclosed within an electromagnetic cover 85. The device 80 includes a through bore 86 which enables it to be fitted at the free end of the fuse well 23 (see FIG. 9). As best seen in FIG. 7, the plate 83 includes first and second parallel walls 87 and 88 defining an internal passage or interstice (not shown) which feeds four net nozzle assemblies 90, 91, 92 and 93 located at the circular periphery of the plate at 90 degree intervals. An intake port 94 communicates with the gas generator 81 to receive gas which is distributed to each of jet nozzle assemblies. Each jet nozzle assembly includes a pair of oppositely facing jet nozzles 95 which are controlled by a dual valve seat member 96 (FIG. 8) opened by pairs of poppet valves 97 independently controlled by a solenoid actuator unit 98 which receives control commands from the guidance electronics.

Referring again to FIG. 9, while the GPS antenna system 27 is mounted at the tail section 22 of the bomb, the remaining components are all positioned at the forward end 21 of the main body 20, and installation is a simple "plug-in" operation which may be done at any time prior to the loading of the bomb bay, and after the electronics have been programmed for a preselected target or targets. In some instances, it may be desirable to reconfigure the housing of the guidance unit in order that the overall length of the bomb remain unaltered, thus facilitating the fitting of the bomb within the bomb bay.

It may thus be seen that I have invented a novel and highly useful precision guidance system for conventional aircraft launched bombs (or other vehicles) which is considerably simpler in construction and operation than that of the prior art, and particularly suited for use with any vehicle which needs an inexpensive method of effecting precision position. The system provides significant control force and accuracy while requiring only limited space. The cost to manufacture such a system, because of its simplicity, will be substantially less than that of prior art systems, while affording considerably more accurate results, decreased expendable expenditures, and decrease the delivery vehicle sortie rate.

I wish it to be understood that I do not consider the invention to be limited to the precise details of structure shown and set forth in the specification, for obvious modifications will occur to those skilled in the art to which the invention pertains.

I claim:

1. A method of initializing a deployable ordnance from an airborne aircraft comprising: receiving GPS information from GPS satellites by a receiver on board said aircraft, and continuously broadcasting at radio frequency the received GPS information to the deployable ordnance prior to deployment from said aircraft.

2. A method according to claim 1, further comprising the deployable ordnance receiving the broadcast GPS information prior to deployment.

3. The method set forth in claim 1 in which initialization includes using a beginning of a message code which designates the guidance and control systems on selected ordnance to be activated, actuating said guidance and control systems, providing terminal GPS position and velocity information, and transmitting said information via multiple radio frequency data links to said selected ordnance prior to deployment.

4. A deployable ordnance initialization system for deploying ordnance carried by an airborne aircraft comprising; a GPS receiver carried by said aircraft and adapted to receive GPS information from GPS satellites; a repeater carried by said aircraft and operationally coupled to receive the GPS information from said GPS receiver and continuously broadcast at radio frequency the GPS information from said GPS receiver to said deployable ordnance prior to deployment; and a receiver carried by said deployable ordnance and operatively coupled to receive the GPS information broadcast at radio frequency by said repeater.

* * * * *